US009827988B2

United States Patent
Kim et al.

(10) Patent No.: US 9,827,988 B2
(45) Date of Patent: Nov. 28, 2017

(54) APPARATUS AND METHOD FOR CONTROLLING OPERATING POINT OF HYBRID ELECTRIC VEHICLE

(71) Applicant: Hyundai Motor Company, Seoul (KR)

(72) Inventors: Do Hee Kim, Gyeonggi-do (KR); Tae Soo Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 81 days.

(21) Appl. No.: 14/852,570

(22) Filed: Sep. 13, 2015

(65) Prior Publication Data

US 2016/0257298 A1 Sep. 8, 2016

(30) Foreign Application Priority Data

Mar. 2, 2015 (KR) .................. 10-2015-0029316

(51) Int. Cl.
*B60W 30/188* (2012.01)
*B60W 10/08* (2006.01)
(Continued)

(52) U.S. Cl.
CPC .......... *B60W 30/188* (2013.01); *B60W 10/06* (2013.01); *B60W 10/08* (2013.01); *B60W 20/10* (2013.01); *B60W 20/13* (2016.01); *B60W 30/1882* (2013.01); *B60W 50/10* (2013.01); *B60W 2050/0051* (2013.01); *B60W 2510/0638* (2013.01); *B60W 2510/0657* (2013.01); *B60W 2520/10* (2013.01); *B60W 2540/10* (2013.01); *B60W 2710/0644* (2013.01);

(Continued)

(58) Field of Classification Search
None
See application file for complete search history.

(56) References Cited

U.S. PATENT DOCUMENTS

| 2005/0088139 A1* | 4/2005 | Frank ........................ B60K 6/48 320/104 |
| 2009/0118085 A1* | 5/2009 | Heap ...................... B60K 6/445 477/5 |

(Continued)

FOREIGN PATENT DOCUMENTS

| JP | 2011-131830 A | 7/2011 |
| KR | 10-2007-0117860 A | 12/2007 |

(Continued)

*Primary Examiner* — Rami Khatib
*Assistant Examiner* — Nicholas K Wiltey
(74) *Attorney, Agent, or Firm* — Mintz Levin Cohn Ferris Glovsky and Popeo, P.C.; Peter F. Corless

(57) ABSTRACT

An apparatus and a method for controlling an engine operating point of a hybrid electric vehicle are provided to determine charging and discharging tendency based on a moving average of an engine torque and a demand torque as well as a dynamical event capture. The method includes detecting a demand torque of a driver and determining a charging and discharging tendency by calculating a moving average based on the demand torque. System efficiency is then reflected using a dynamical event capture and the charging and discharging tendency is leveled. A compensation amount of the operating point is also determined based on the leveling of the charging and discharging tendency and the operating point of the hybrid electric vehicle is adjusted based on the compensation amount of the operating point.

16 Claims, 5 Drawing Sheets

(51) Int. Cl.
    *B60W 50/10*    (2012.01)
    *B60W 10/06*    (2006.01)
    *B60W 20/10*    (2016.01)
    *B60W 20/13*    (2016.01)
    *B60W 50/00*    (2006.01)

(52) U.S. Cl.
    CPC .............. *B60W 2710/0666* (2013.01); *B60W 2710/081* (2013.01); *B60W 2710/083* (2013.01); *Y02T 10/56* (2013.01); *Y02T 10/6286* (2013.01); *Y02T 10/84* (2013.01); *Y10S 903/902* (2013.01)

(56) References Cited

U.S. PATENT DOCUMENTS

| | | | | |
|---|---|---|---|---|
| 2009/0118920 A1* | 5/2009 | Heap | ............... | B60K 6/365 |
| | | | | 701/54 |
| 2015/0266462 A1* | 9/2015 | Johri | ............... | B60W 10/02 |
| | | | | 701/22 |
| 2015/0291152 A1* | 10/2015 | Mould | ............. | B60W 20/1088 |
| | | | | 701/22 |

FOREIGN PATENT DOCUMENTS

| | | |
|---|---|---|
| KR | 10-2009-0063291 A | 6/2009 |
| KR | 10-2013-0136780 A | 12/2013 |

\* cited by examiner

/ # APPARATUS AND METHOD FOR CONTROLLING OPERATING POINT OF HYBRID ELECTRIC VEHICLE

CROSS-REFERENCE TO RELATED APPLICATION

This application claims priority to and the benefit of Korean Patent Application No. 10-2015-0029316 filed in the Korean Intellectual Property Office on Mar. 2, 2015, the entire contents of which are incorporated herein by reference.

BACKGROUND (a) Field of the Invention

The present invention relates to an apparatus and a method for controlling an operating point of a hybrid electric vehicle. More particularly, the present invention relates to an apparatus and a method for controlling an engine operating point of a hybrid electric vehicle that determines charging and discharging tendency based on a moving average of an engine torque and a demand torque as well as a dynamical event capture, and controls an operating point based on the determined charging and discharging tendency.

(b) Description of the Related Art

A hybrid vehicle is a vehicle that uses two or more different types of power sources, and is generally driven by an engine that obtains a driving torque by burning a fuel and a motor that obtains a driving torque with battery power. Hybrid electric vehicles may be provided with optimum output torque, depending on how the engine and the motor are operated while a vehicle is driven by the two power sources, that is, the engine and the motor. In particular, an operating point determined by a torque and a speed of an engine and a motor based on a demand torque of a driver are calculated based on system efficiency.

Meanwhile, the operating point of the hybrid electric vehicle may be affected by a driving propensity of the driver. In other words, a fuel consumption deviation may be generated based on the driving propensity of the driver in equivalent situations. In the related art, the operating point is controlled by a driving signal of the driver and factors such as a vehicle speed and a shift stage. However, the operating point cannot reflect charging and discharging efficiency of a battery, thus causing potential system efficiency deterioration.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling an operating point of a hybrid electric vehicle having advantages of determining charging and discharging tendency based on a moving average of an engine torque and a demand torque as well as a dynamical event capture, and controlling an operating point based on the determined charging and discharging tendency.

An exemplary embodiment of the present invention provides a method for controlling an operating point of a hybrid electric vehicle that may include: detecting a demand torque of a driver; determining charging and discharging tendency by calculating a moving average based on the demand torque; reflecting system efficiency through a dynamical event capture and performing leveling of the charging and discharging tendency; determining a compensation amount of the operating point based on the leveling of the charging and discharging tendency; and adjusting the operating point of the hybrid electric vehicle based on the compensation amount of the operating point.

The determination of a compensation amount of the operating point based on the leveling of the charging and discharging tendency may include: determining a basic compensation amount of the operating point; determining an entry point of compensation; determining a compensation scaling factor based on the leveling of the charging and discharging tendency; and determining a final compensation amount of the operating point based on the basic compensation amount of the operating point and the compensation scaling factor.

The moving average may be calculated by determining a charging and discharging tendency torque based on a difference between an engine reference torque and the demand torque. The dynamical event capture may be performed by capturing a flow of the demand torque on coordinates composed of an engine torque and an engine speed. The dynamical event capture may subdivide the coordinates composed of the engine torque and the engine speed into a box and determine charging and discharging tendency based on a number of times the flow of the demand torque passes through a boundary of the box.

Another exemplary embodiment of the present invention provides an apparatus for controlling an operating point of a hybrid electric vehicle that may include: a driving information detector configured to detect a running state of the hybrid electric vehicle and a demand torque of a driver; a charging and discharging tendency determiner configured to calculate a moving average based on a signal transmitted from the driving information detector and determine charging and discharging tendency through a dynamical event capture; and an operating point determiner configured to determine a compensation amount of the operating point based on the charging and discharging tendency.

The driving information detector may include: an accelerator pedal position sensor configured to detect a position value of an accelerator pedal; a vehicle speed sensor configured to detect a vehicle speed; an engine speed sensor configured to detect an engine speed; and a motor speed sensor configured to detect a motor speed. The charging and discharging tendency determiner may be configured to calculate the moving average by determining a charging and discharging tendency torque based on a difference between an engine reference torque and the demand torque.

The charging and discharging tendency determiner may be configured to perform the dynamical event capture by capturing a flow of the demand torque on coordinates including an engine torque and an engine speed. The charging and discharging tendency determiner may further be configured to perform the dynamical event capture by subdividing the coordinates of the engine torque and the engine speed into a box (e.g., predetermined boundaries) and determining charging and discharging tendency based on a number of times the flow of the demand torque passes through a boundary of the box. The charging and discharging tendency determiner may reflect system efficiency through the dynamical event capture and may be configured to perform leveling of (e.g., may be configured to compensate for) the charging and discharging tendency. The operating point determiner may be configured to determine a basic compensation amount of the operating point, a basic compensation amount of the operating point, a compensation scaling factor, and a final compensation amount of the operating point.

As described above, according to an exemplary embodiment of the present invention, a demand torque of a driver may be reflected to charging and discharging tendency by a dynamical event capture. Therefore, fuel efficiency of the hybrid electric vehicle may be improved by preventing an operation of an engine in an inefficient region. In addition, the operating point according to the demand torque of the driver may be directly monitored to increase completeness of operating point control logic.

BRIEF DESCRIPTION OF THE DRAWINGS

The drawings are for reference in describing an exemplary embodiment of the present invention, so that it shall not be construed that the technical spirit of the present invention is limited to the accompanying drawings.

DETAILED DESCRIPTION

Figure 1:
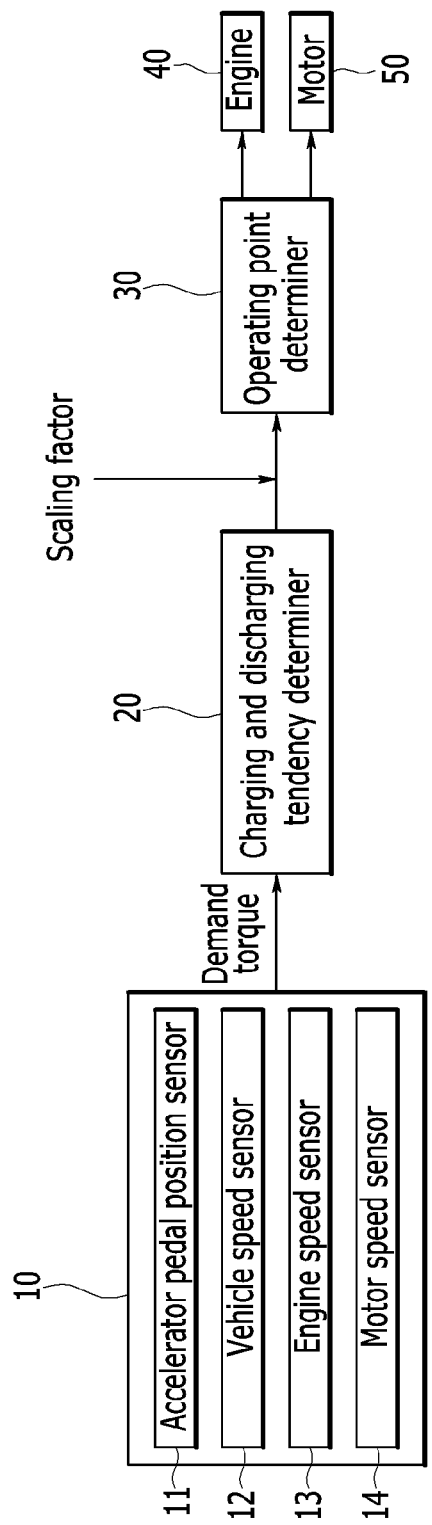
FIG. 1 is a block diagram illustrating an apparatus for controlling an operating point of a hybrid electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, exemplary embodiments of the present invention have been shown and described, simply by way of illustration. As those skilled in the art would realize, the described exemplary embodiments may be modified in various different ways, all without departing from the spirit or scope of the present invention.

An exemplary embodiment of the present invention will hereinafter be described in detail with reference to the accompanying drawings.

FIG. 1 is a block diagram illustrating an apparatus for controlling an operating point of a hybrid electric vehicle according to an exemplary embodiment of the present invention. As shown in FIG. 1, an apparatus for controlling an operating point of a hybrid electric vehicle according to an exemplary embodiment of the present invention may include a driving information detector 10, a charging and discharging tendency determiner 20, an operating point determiner 30, an engine 40, and a motor 50. The various components of the apparatus may be executed by a controller having a memory and a processor.

The hybrid electric vehicle to which an exemplary embodiment of the present invention is applied may include at least one engine 40 and at least one motor 50. In addition, the hybrid electric vehicle provides a driving mode in which the engine 40 and the motor 50 separately or simultaneously operate as a power source. For this purpose, an engine clutch may be disposed between the engine 40 and the motor 50 to selectively connect the engine 40 and the motor 50.

The engine 40 may be configured to output power as a power source when turned on. The motor 50 may be operated by a 3-phase alternating current (AC) voltage applied from the battery through an inverter to generate torque, and may operate as a power generator and may be configured to supply regenerative energy to the battery in a coast-down mode. The driving information detector 10 may be configured to detect a running state of the hybrid electric vehicle and a demand torque of a driver, and may include an accelerator pedal position sensor 11, a vehicle speed sensor 12, an engine speed sensor 13, and a motor speed sensor 14.

The accelerator pedal position sensor 11 may be configured to continuously detect a position value of an accelerator pedal (e.g., an engagement amount or degree of the accelerator pedal, that is, how much pressure is exerted on the pedal). The position value of the accelerator pedal may be 100% when the accelerator pedal fully engaged (e.g., fully pressed), and the position value of the accelerator pedal may be 0% when the accelerator pedal is disengaged (e.g., no pressure is exerted onto the pedal). The vehicle speed sensor 12 may be configured to detect a speed of the vehicle, and may be mounted to a wheel of the hybrid electric vehicle. The engine speed sensor 13 may be configured to detect a rotation speed of the engine 40 and the motor speed sensor 14 may be configured to detect a rotation speed of the motor 50.

The charging and discharging tendency determiner 20 may be configured to calculate a moving average based on a signal transmitted from the driving information detector 10, and determine a charging and discharging tendency using a dynamical event capture. The charging and discharging tendency determiner 20 may further be configured to calculate the moving average by determining a charging and discharging tendency torque based on a difference between an engine reference torque and the demand torque. Additionally, the charging and discharging tendency determiner 20 may be configured to perform the dynamical event capture by capturing a flow of the demand torque on a coordinate including an engine torque and an engine speed.

Furthermore, the charging and discharging tendency determiner 20 may be configured to reflect system efficiency using the dynamical event capture and perform leveling of the charging and discharging tendency (e.g., compensate for the tendency). For these purposes, the charging and discharging tendency determiner 20 may include one or more microprocessors, and the one or more microprocessors may be executed by a predetermined program for determining charging and discharging tendency based on the demand torque of the driver.

The operating point determiner 30 may be configured to determine a basic compensation amount of the operating point, a compensation scaling factor, and a final compensation amount of the operating point. The operating point determiner 30 may further be configured to operate the engine 40 and the motor 50 based on the final compensation amount of the operating point, and operate a battery state of charge (SOC). For these purposes, the operating point determiner 30 may include one or more microprocessors, and the one or more microprocessors may be executed by a predetermined program for determining a compensation amount of the operating point according to the charging and discharging tendency.

Hereinafter, a method for controlling an operating point of a hybrid electric vehicle according to an exemplary embodiment of the present invention will be described in detail with reference to the accompanying drawings.

Figure 2:
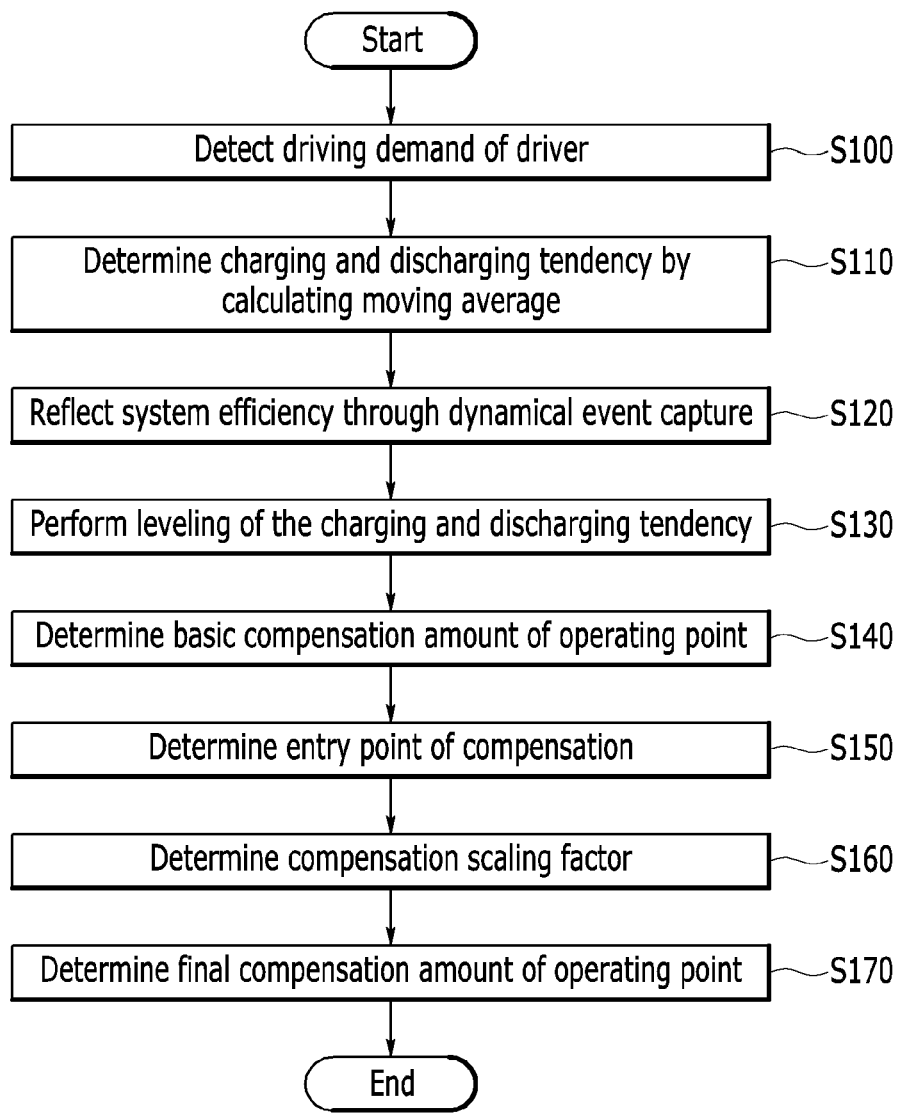
FIG. 2 is a flowchart illustrating a method for controlling an operating point of a hybrid electric vehicle according to an exemplary embodiment of the present invention.

FIG. 2 is a flowchart illustrating a method for controlling an operating point of a hybrid electric vehicle according to an exemplary embodiment of the present invention. As shown in FIG. 2, a method for controlling an operating point of a hybrid electric vehicle according to an exemplary embodiment of the present invention may include detecting a driving demand of a driver at step S100. When the driving demand of the driver is detected at the step S100, the charging and discharging tendency determiner 20 may be configured to determine a charging and discharging tendency by calculating a moving average at step S110.

Figure 3:
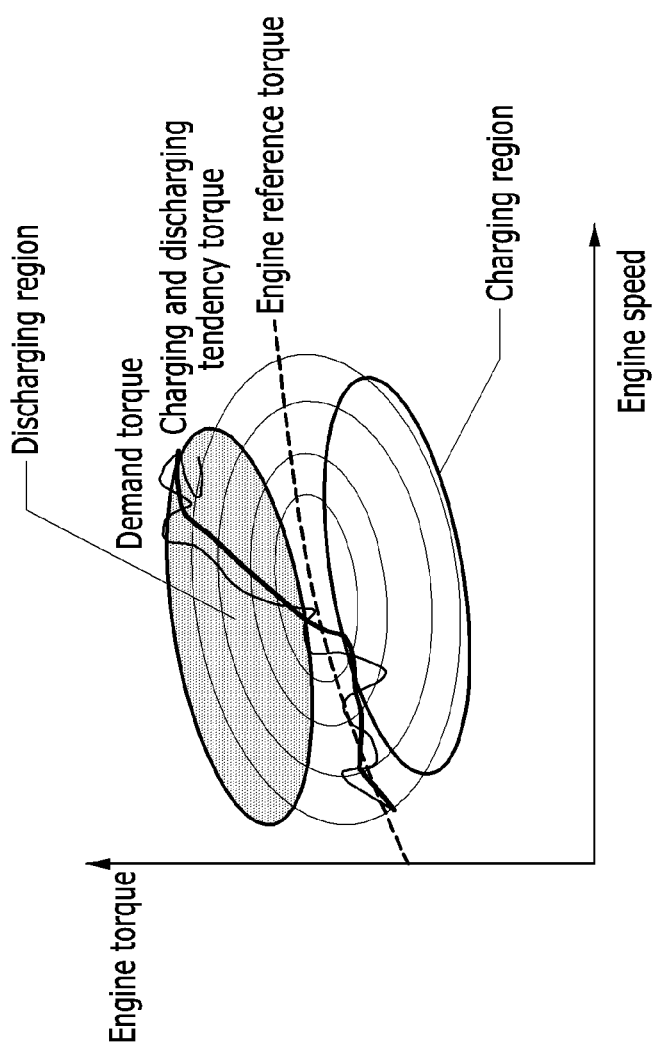
FIG. 3 is a graph showing charging and discharging regions to determine charging and discharging tendency according to an exemplary embodiment of the present invention.

A method for determining the charging and discharging tendency by calculating the moving average by the charging and discharging tendency determiner 20 according to an exemplary embodiment of the present invention is shown in FIG. 3. FIG. 3 is a graph showing charging and discharging regions to determine charging and discharging tendency according to an exemplary embodiment of the present invention.

As shown in FIG. 3, when an engine torque is greater than an engine reference torque, the engine torque may be within a discharging region, and when the engine torque is less than the engine reference torque, the engine torque may be within a charging region. First, the charging and discharging tendency determiner 20 may be configured to determine the moving average based on a difference between the engine reference torque and the demand torque. Then, the charging and discharging tendency determiner 20 may be configured to determine a charging and discharging tendency torque by reflecting the moving average to the engine reference torque.

Accordingly, the charging and discharging tendency determiner 20 may be configured to detect where the charging and discharging tendency torque is located, and determine the charging and discharging tendency. For example, as shown in FIG. 3, the charging and discharging tendency torque is within the discharging region. Thus, the charging and discharging tendency determiner 20 may be configured to determine a discharging tendency. When the charging and discharging tendency is determined at the step S110, the charging and discharging tendency determiner 20 may be configured to reflect system efficiency using a dynamical event capture at step S120.

Figure 4:
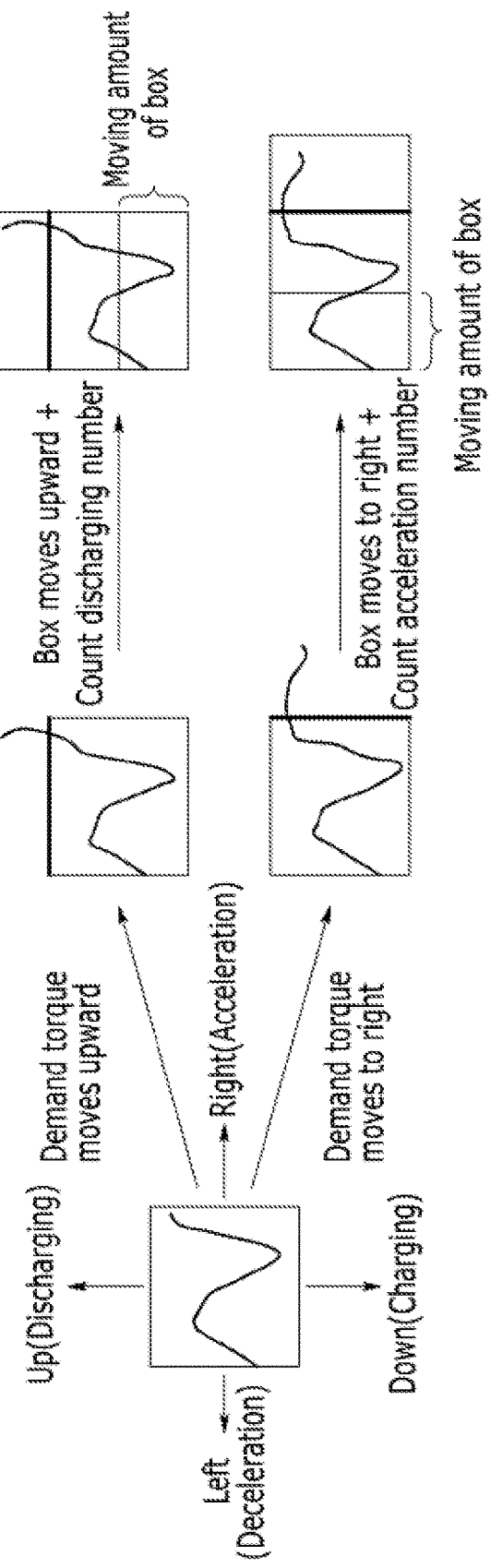
FIG. 4 is a diagram provided for description of a dynamical event capture according to an exemplary embodiment of the present invention.

A method for performing the dynamical event capture by the charging and discharging tendency determiner 20 according to an exemplary embodiment of the present invention is shown in FIG. 4. FIG. 4 is a diagram provided for description of a dynamical event capture according to an exemplary embodiment of the present invention.

As shown in FIG. 4, the charging and discharging tendency determiner 20 may be configured to subdivide the coordinates including the engine torque and the engine speed into a box (e.g., within predetermined boundaries). In other words, left and right (e.g., horizontal, x-axis) boundaries of the box are a function of the engine speed, and up and down (e.g., vertical, y-axis) boundaries of the box are a function of the engine torque. An initial position of the box may be set arbitrarily. The box may be moved based on a flow of the demand torque. In particular, the box may move in a direction where the flow of the demand torque passes through the boundary of the box. In other words, a change of the demand torque in the box may not move the box.

As shown in FIG. 4, when the demand torque moves upward, the demand torque passes through an upper boundary of the box. Thus, the charging and discharging tendency determiner 20 may be configured to count a discharging number and move the box upward. In addition, when the demand torque moves to the right, the demand torque passes through a right boundary of the box. Thus, the charging and discharging tendency determiner 20 may be configured to count an acceleration number and move the box to the right. A moving amount of the box may be predetermined.

As described above, system efficiency of the demand torque may be reflected by the dynamical event capture. When the dynamical event capture is performed at the step S120, the charging and discharging tendency determiner 20 may be configured to level (e.g., compensate for) the charging and discharging tendency based on the moving average and the dynamical event capture at step S130.

For example, when a difference between numbers of passing an upper boundary of the box and numbers of passing a lower boundary of the box is greater than a predetermined value, the charging and discharging tendency determiner 20 may be configured to determine a discharging tendency. Additionally, when a difference between numbers of passing a right boundary of the box and numbers of passing a left boundary of the box is greater than a predetermined value, the charging and discharging tendency determiner 20 may be configured to determine an acceleration tendency. In other words, the charging and discharging tendency determiner 20 may be configured to level the charging and discharging tendency based on the difference between numbers of passing the upper boundary of the box and numbers of passing the lower boundary of the box or between numbers of passing the right boundary of the box and numbers of passing the left boundary of the box.

When the leveling of the charging and discharging tendency is performed at the step S130, the operating point determiner 30 may be configured to determine a basic compensation amount of the operating point based on the leveling of the charging and discharging tendency at step S140. For example, the operating point determiner 30 may be configured to level the charging and discharging tendency torque based on the leveling of the charging and discharging tendency.

Moreover, the operating point determiner 30 may be configured to determine an entry point of compensation at step S150. The entry point of compensation may be determined based on the difference between numbers of passing the right boundary of the box and numbers of passing the left boundary of the box. For example, the entry point of compensation may be advanced when the leveling of the charging and discharging tendency is determined as the acceleration tendency.

In addition, the operating point determiner 30 may be configured to determine a compensation scaling factor based on the leveling of the charging and discharging tendency at step S160. The compensation scaling factor may be determined based on the difference between numbers of passing the upper boundary of the box and numbers of passing the lower boundary of the box. When the entry point of compensation is determined at the step S150 and the compensation scaling factor may be determined at the step S160 and the operating point determiner 30 may be configured to determine a final compensation amount of the operating point at step S170. The final compensation amount of the operating point may be determined based on the entry point of compensation and the compensation scaling factor.

As described above, according to an exemplary embodiment of the present invention, the operating point of the hybrid electric vehicle may be controlled according to the charging and discharging tendency.

Figure 5:
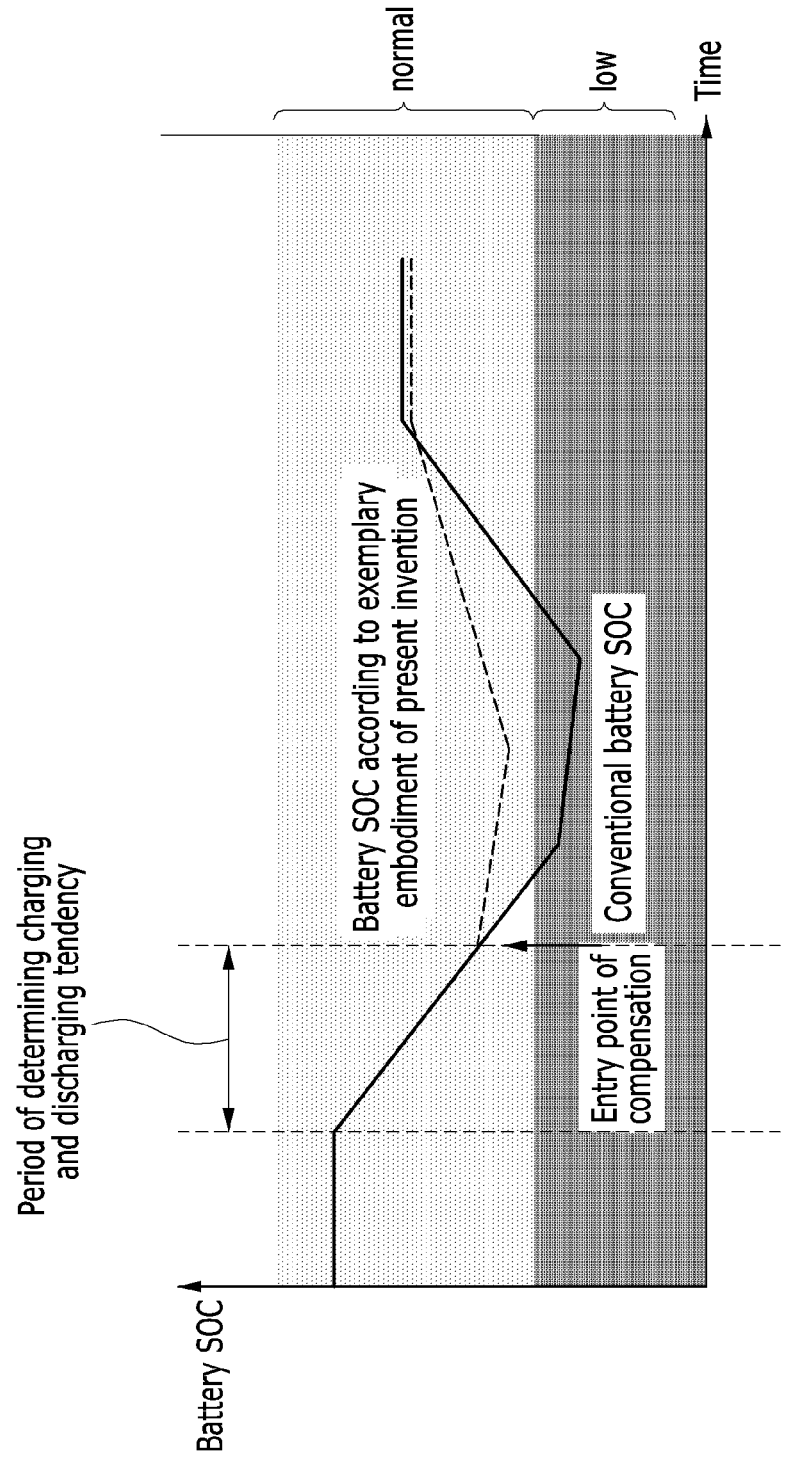
FIG. 5 is a graph showing a battery SOC changed by a compensation amount of an operating point according to an exemplary embodiment of the present invention.

FIG. 5 is a graph showing a battery SOC changed by a compensation amount of an operating point according to an exemplary embodiment of the present invention. As shown in FIG. 5, according to an exemplary embodiment of the present invention, a battery SOC may be maintained in a normal region since the demand torque of the driver may be reflected to the charging and discharging tendency.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A method for controlling an engine operating point of a hybrid electric vehicle, comprising:
   detecting, by a controller, a demand torque of a driver;
   determining, by the controller, a charging and discharging tendency by calculating a moving average based on the demand torque;
   reflecting, by the controller, system efficiency using a dynamical event capture and leveling the charging and discharging tendency;
   determining, by the controller, a final compensation amount of the engine operating point based on the leveling of the charging and discharging tendency; and
   adjusting, by the controller, the engine operating point of the hybrid electric vehicle based on the final compensation amount of the engine operating point,
   wherein the moving average is calculated by determining a charging and discharging tendency torque based on a difference between an engine reference torque and the demand torque.

2. The method of claim 1, wherein the determination of a final compensation amount of the engine operating point based on the leveling of the charging and discharging tendency comprises:
   determining, by the controller, a basic compensation amount of the engine operating point;
   determining, by the controller, an entry point of compensation;
   determining, by the controller, a compensation scaling factor based on the leveling of the charging and discharging tendency; and
   determining, by the controller, the final compensation amount of the engine operating point based on the basic compensation amount of the engine operating point and the compensation scaling factor.

3. The method of claim 1, wherein the dynamical event capture is performed by capturing a flow of the demand torque on coordinates including an engine torque and an engine speed.

4. The method of claim 3, wherein the dynamical event capture includes:
   subdividing, by the controller, the coordinates of the engine torque and the engine speed into a box and
   determining, by the controller, the charging and discharging tendency based on a number of times the flow of the demand torque passes through a boundary of the box.

5. An apparatus for controlling an engine operating point of a hybrid electric vehicle, comprising:
   a memory configured to store program instructions; and
   a processor configured to execute the program instructions, the program instructions when executed configured to:
   detect a running state of the hybrid electric vehicle and a demand torque of a driver;
   calculate a moving average based on a received signal of the running state and demand torque and determine a charging and discharging tendency using a dynamical event capture; and
   determine a final compensation amount of the engine operating point based on the charging and discharging tendency,
   wherein the program instructions when executed are further configured to calculate the moving average by determining a charging and discharging tendency torque based on a difference between an engine reference torque and the demand torque.

6. The apparatus of claim 5, wherein the apparatus further includes:
   an accelerator pedal position sensor configured to detect a position value of an accelerator pedal;
   a vehicle speed sensor configured to detect a vehicle speed;

an engine speed sensor configured to detect an engine speed; and a motor speed sensor configured to detect a motor speed.

7. The apparatus of claim 5, wherein the dynamical event capture is performed by capturing a flow of the demand torque on coordinates of an engine torque and an engine speed.

8. The apparatus of claim 7, wherein the dynamical event capture is performed by subdividing the coordinates of the engine torque and the engine speed into a box and determining charging and discharging tendency based on a number of times the flow of the demand torque passes through a boundary of the box.

9. The apparatus of claim 5, wherein the program instructions when executed are further configured to:

reflect system efficiency using the dynamical event capture and level the charging and discharging tendency.

10. The apparatus of claim 5, wherein the program instructions when executed are further configured to:

determine a basic compensation amount of the engine operating point, a basic compensation amount of the engine operating point, a compensation scaling factor, and the final compensation amount of the engine operating point.

11. A non-transitory computer readable medium containing program instructions executed by a controller, the computer readable medium comprising:

program instructions that detect a running state of the hybrid electric vehicle and a demand torque of a driver;

program instructions that calculate a moving average based on a received signal of the running state and demand torque and determine a charging and discharging tendency using a dynamical event capture;

program instructions that determine a final compensation amount of an engine operating point based on the charging and discharging tendency; and program instructions that calculate the moving average by determining a charging and discharging tendency torque based on a difference between an engine reference torque and the demand torque.

12. The non-transitory computer readable medium of claim 11, further comprising:

program instructions that detect a position value of an accelerator pedal using an accelerator pedal position sensor;

program instructions that detect a vehicle speed using a vehicle speed sensor;

program instructions that detect an engine speed using an engine speed sensor; and program instructions that detect a motor speed using a motor speed sensor.

13. The non-transitory computer readable medium of claim 11, wherein the dynamical event capture is performed by capturing a flow of the demand torque on coordinates of an engine torque and an engine speed.

14. The non-transitory computer readable medium of claim 13, wherein the dynamical event capture is performed by subdividing the coordinates of the engine torque and the engine speed into a box and determining charging and discharging tendency based on a number of times the flow of the demand torque passes through a boundary of the box.

15. The non-transitory computer readable medium of claim 11, further comprising:

program instructions that reflect system efficiency using the dynamical event capture and level the charging and discharging tendency.

16. The non-transitory computer readable medium of claim 11, further comprising:

program instructions that determine a basic compensation amount of the engine operating point, a basic compensation amount of the engine operating point, a compensation scaling factor, and the final compensation amount of the engine operating point.

\* \* \* \* \*